Mar. 13, 1923.
E. CULVER
LAMP
Filed Mar. 20, 1922
1,448,434
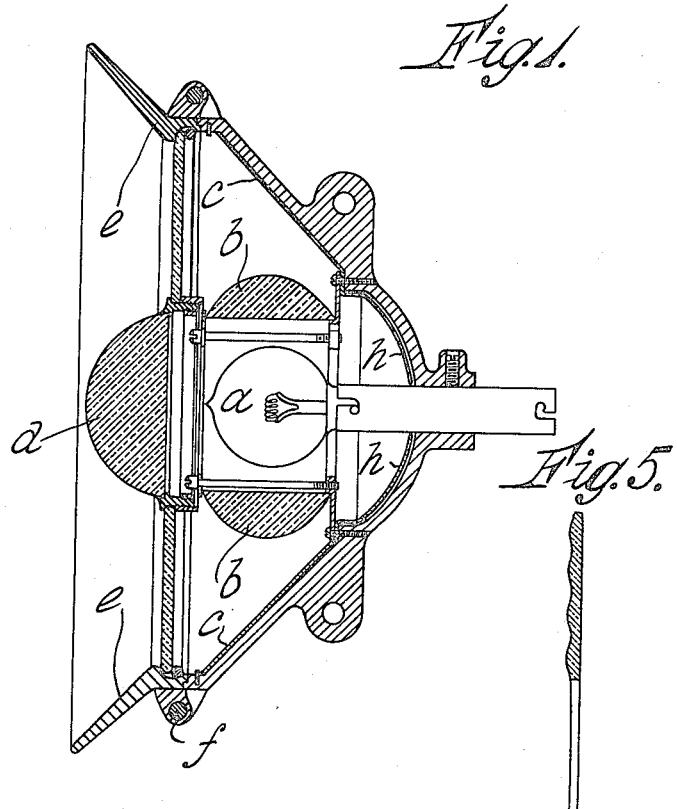
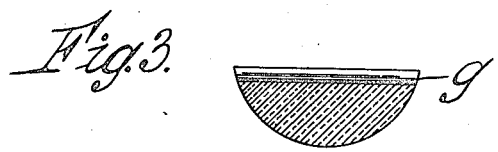
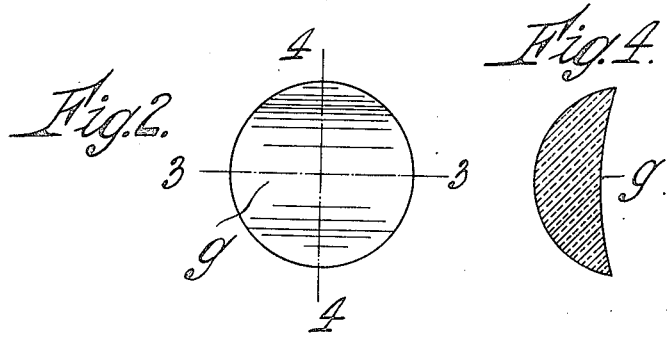
INVENTOR:
EDWARD CULVER,
By his Attorneys, Patented Mar. 13, 1923.

1,448,434

UNITED STATES PATENT OFFICE.

EDWARD CULVER, OF LONDON, ENGLAND.

LAMP.

Application filed March 20, 1922. Serial No. 545,184.

*To all whom it may concern:*

Be it known that I, EDWARD CULVER, a subject of the King of Great Britain, residing at 95/105, White Lion Street, London, England, have invented new and useful Improvements in Lamps, of which the following is a specification.

This invention relates to lamps or lanterns especially applicable for use as headlights for motor cars.

According to this invention I provide around the source of light a toric or dioptric ring of glass which may be one continuous ring or built up in section such that all the rays which fall upon the ring in any one axial plane emerge from the ring parallel to one another, and I provide around this ring a mirror so that the rays emerging from the ring and reflected by the mirror are parallel to one another. In front of the ring I provide a lens which is preferably of the same size as the hole of the ring and which renders parallel rays falling upon it from the source of light. This lens may be a spherical or a spherically corrected lens, the inner face of which is cylindrical, either concave or convex.

The annexed drawings show a lamp made in accordance with this invention. Figure 1 is a section of a lamp, Figure 2 is an elevation looking from the right hand of an alternative form of front lens and Figures 3 and 4 are sections on the lines 3—3 and 4—4, Figure 2. Figure 5 shows cylindrical lenses which may be used in front of the lamp.

*a* is an electric lamp round which is a toric ring of glass *b* and around the ring *b* is a mirror *c* by which the rays emerging from the ring are reflected parallel to one another. In front of the ring *b* is a spherical or spherically corrected lens *d* carried by the front *e* of the lamp which front is mounted to turn about an axis *f*. The lens shown in Figures 2, 3 and 4 may be substituted for the lens *d*. The lens shown in these figures is a spherical or spherically corrected lens having a part *g* cut away. The part *g* forms a part of a cylinder whose axis is such that it causes the rays to diverge in a horizontal direction. Behind the lamp *a* is a mirror *h*.

Cylindrical lenses (see Figure 5) which will cause the rays to diverge in any desired direction, may be fixed to the front of the lamp.

Lanterns such as those described above may be used in lighthouses, in which case the light is caused to issue in a direction parallel to the axis of the dioptric ring and is reflected by a mirror which may revolve.

What I claim is:—

1. A lamp comprising a source of light, a light transmitting toric ring at the center of which the light source is placed, a spherical mirror placed at the rear opening in the toric ring, means surrounding the toric ring and reflecting the parallel rays which issue from the toric ring in a parallel forward direction, and a lens placed in front of the hole in the toric ring and transmitting the rays passing therethrough in a direction parallel with the first mentioned rays.

2. A lamp comprising a source of light, a light transmitting toric ring at the center of which the light source is placed, a spherical mirror placed at the rear opening in the toric ring, means surrounding the toric ring and reflecting the parallel rays which issue from the toric ring in a parallel forward direction, a lens placed in front of the hole in the toric ring and transmitting the rays passing therethrough in a direction parallel with the first mentioned rays, and a front glass surrounding said lens and constructed to give lateral dispersion to the parallel rays reflected from said means.

3. A lamp comprising a source of light, a light transmitting toric ring at the center of which the light source is placed, a spherical mirror at the rear of the opening in the toric ring, a lens at the front opening of the toric ring, and a conical reflector surrounding said toric ring, all of said elements being arranged to project substantially all of the light from the light source in a forward parallel beam.

4. A lamp comprising a source of light, a light transmitting toric ring at the center of which the light source is placed, a spherical mirror closing the rear opening in the toric ring, a lens closing the front opening in the toric ring, a conical reflector surrounding said toric ring, all of said elements being arranged to project substantially all of the light from the light source in a forward parallel beam, and a front glass surrounding said lens and constructed to give lateral dispersion to the parallel rays reflected from the conical reflector.

In testimony that I claim the foregoing as my invention I have signed my name this 8th day of March, 1922.

EDWARD CULVER.